US012664916B2

(12) United States Patent
Kenney

(10) Patent No.: US 12,664,916 B2
(45) Date of Patent: Jun. 23, 2026

(54) SIGN BOARD LEG ACCOMMODATING GROUND STAKE AND METHOD OF USE

(71) Applicant: Matthew Kenney, Phoenix, AZ (US)

(72) Inventor: Matthew Kenney, Phoenix, AZ (US)

( * ) Notice: Subject to any disclaimer, the term of this patent is extended or adjusted under 35 U.S.C. 154(b) by 71 days.

(21) Appl. No.: 18/675,258

(22) Filed: May 28, 2024

(65) Prior Publication Data

US 2025/0140135 A1 May 1, 2025

Related U.S. Application Data

(60) Provisional application No. 63/594,564, filed on Oct. 31, 2023.

(51) Int. Cl.
*E04H 15/62* (2006.01)
*G09F 7/18* (2006.01)

(52) U.S. Cl.
CPC ............... *G09F 7/18* (2013.01); *E04H 15/62* (2013.01); *G09F 2007/1834* (2013.01)

(58) Field of Classification Search
CPC ........................ G09F 2007/1834; E04H 15/62
USPC ..... 40/607.05, 607.06; 52/165; D8/391, 393
See application file for complete search history.

(56) References Cited

U.S. PATENT DOCUMENTS 4,232,467 A 11/1980 Stewart
4,378,650 A * 4/1983 Ottoson .................... E02D 5/80 40/607.08
4,658,527 A 4/1987 Pingel
4,866,866 A * 9/1989 Rotter ................. G09F 15/0062 40/610
4,870,781 A * 10/1989 Jones ..................... A01G 17/04 248/27.8
4,894,937 A 1/1990 Davis
5,165,663 A * 11/1992 Wells .................. E04H 12/2269 52/165
5,502,910 A * 4/1996 Lucchesi ................... G09F 7/22 40/607.04
5,881,495 A * 3/1999 Clark ....................... A01G 9/12 52/165

(Continued)

FOREIGN PATENT DOCUMENTS

DE 202013000241 U1 * 2/2013 ............ E04H 15/62
NZ 264600 A * 5/1997
WO WO-2010102339 A1 * 9/2010 ............ E04H 15/62

OTHER PUBLICATIONS

DE-202013000241-U1 English Translation (Year: 2013).*

*Primary Examiner* — Kyle R Grabowski
(74) *Attorney, Agent, or Firm* — Brennan, Manna & Diamond, LLC

(57) ABSTRACT

A sign stake system designed for supporting various types of signage, particularly useful for campaign, yard, and garage sale signs is disclosed. The stake includes a head and a tapered shaft. The head includes an upper surface suitable for being struck by a mallet to facilitate easy ground insertion. An aperture is disposed on the head and is compatible with standard signage frame legs, ensuring a snug fit and preventing unintentional dislodgement of the sign. The tapered shaft features integrated longitudinal ridges for secure ground penetration and stability against wind and external forces. Additionally, the system allows for the use of multiple stakes, installed at specific distances corresponding to the frame legs of the sign, thus providing enhanced support and orientation.

7 Claims, 3 Drawing Sheets

(56) References Cited

U.S. PATENT DOCUMENTS

| | | | | |
|---|---|---|---|---|
| 6,547,204 | B1 | 4/2003 | Peck | |
| 9,620,036 | B1 | 4/2017 | Hartman | |
| 10,283,021 | B1 | 5/2019 | Hartman | |
| 2006/0162207 | A1 * | 7/2006 | Morton | G09F 15/00<br>40/607.05 |
| 2011/0047896 | A1 * | 3/2011 | Vosbikian | A45F 3/44<br>52/165 |

* cited by examiner

SIGN BOARD LEG ACCOMMODATING GROUND STAKE AND METHOD OF USE

CROSS-REFERENCE TO RELATED APPLICATION

The present application claims priority to, and the benefit of, U.S. Provisional Application No. 63/594,564, which was filed on Oct. 31, 2023, and is incorporated herein by reference in its entirety.

FIELD OF THE INVENTION

The present invention generally relates to the field of ground stakes. More specifically, the present invention relates to a novel stake made of a heavy-duty, durable, and rigid plastic or metal that can easily be hammered into the ground. The stake has a small aperture on the top surface thereof to perfectly receive and accommodate the leg of a sign board frame. The stake has a tapered shaft and includes ridges to better secure the stake onto a ground surface. The stake obviates direct installation of the sign board legs into the ground. Accordingly, the present disclosure makes specific reference thereto. Nonetheless, it is to be appreciated that aspects of the present invention are also equally applicable to other like applications, devices, and methods of manufacture.

BACKGROUND

By way of background, signs are displayed for real estate advertisements, garage sales, political campaigns, and other indications. Typically, such signs use an H-shaped frame, rebar, or other poles to maintain their structure and keep the sign secure. The H-shaped frame is a common design where two vertical supports are connected by a crossbar, resembling the letter 'H'. However, a significant issue with conventional frames is that they are often made of materials that are not very durable. The frames are weak and fragile, making them susceptible to damage.

Installing the frames can also be challenging, particularly on and into hard ground. The effort required to insert the frame into tough soil or turf can result in damage to the legs of the frame. Since the materials are not very robust, the legs can break or bend during the installation process. Weak frames can lead to the sign breaking or, in cases of strong wind, blowing over and potentially being blown away. Breaking or bending of the sign provides a significant setback for the advertising as the message is not conveyed properly to passers-by.

Because of the fragility and susceptibility to damage of conventional frames, the signs may require frequent reinstallation or reorienting, which can be time-consuming and frustrating. The inconvenience might lead people to abandon the use of these signs altogether, seeking other methods of advertisement or indication. People desire an improved way of installing frames for signs that does not require installing the frame legs directly into the ground.

Therefore, there exists a long-felt need in the art for heavy-duty ground stakes for supporting the legs of sign frames. There is also a long-felt need in the art for a ground stake that is designed to accommodate and support the leg of a sign frame. Additionally, there is a long-felt need in the art for a ground stake that eliminates installation of a sign frame directly into the ground. Moreover, there is a long-felt need in the art for an improved stake that includes a small aperture on top of the stake to receive the sign leg and keep the leg secure and. upright to advertise the signage. Further, there is a long-felt need in the art for a stake designed for sign frames that address the fragility, susceptibility to damage, and the consequent inconvenience of conventional frames. Finally, there is a long-felt need in the art for an improved stake that makes it much easier and more convenient to support signs that designate a real estate sale, a voting issue, an election, a garage sale, a yard sale, and much more.

The subject matter disclosed and claimed herein, in one embodiment thereof, comprises a sign frame supporting a stake for supporting sign boards and maintaining sign boards in an upright position. The ground stake further comprises a round head that has an upper surface and a lower surface. A tapered shaft extends from the top end thereof to a pointed terminating end. A plurality of ridges are integrated longitudinally along opposite sides of the shaft, each ridge points towards the terminating end. The head includes an aperture on the upper surface for receiving and accommodating a leg of a sign frame. The stake is made of heavy-duty plastic or metal and the head abuts the ground surface when the stake is installed in the ground.

In this manner, the sign frame supporting stake of the present invention accomplishes all of the foregoing objectives and provides users with a heavy-duty ground stake capable of supporting the legs of a sign frame. The aperture in the head of the stake receives the sign frame leg and keeps it secure and upright to advertise the signage. The stake can be used with different types of advertisement signs and provides ease of installation and removal. The stake provides stability against wind and the elimination of the need for digging or additional fastening tools.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a ground stake for supporting sign boards and maintaining sign boards in an upright position. The ground stake further comprises a round head that has an upper surface and a lower surface. A tapered shaft extends from a top end thereof to a pointed terminating end. A plurality of ridges are integrated longitudinally along opposite sides of the shaft, each ridge points towards the terminating end. The head includes an aperture on the upper surface for receiving and accommodating a leg of a sign frame.

In another aspect, a ground stake for displaying signage is disclosed. The ground stake includes a head having an upper surface and a lower surface. A central aperture is disposed in the head designed to receive and secure the leg of a signage frame. A shaft extends from the head and tapers towards a pointed terminating end. The shaft includes a series of longitudinal ridges on opposing sides for enhanced ground gripping. The length of the shaft ranges from approximately 1.00 inches to 8.00 inches and the diameter of the head ranges from approximately 0.5 inches to 2 inches.

In yet another embodiment, the material of the ground stake is a heavy-duty, durable, and rigid plastic or metal capable of withstanding external elements and usage over time.

In a further embodiment, the aperture has a diameter compatible with standard signage frame legs to provide a snug fit, preventing unintentional swinging or leaning, disengagement, and dislodging of the signage leg.

In yet another aspect of the present invention, a lightweight sign stake for supporting a leg of a signage frame is disclosed. The stake includes a head with an upper surface designed to be struck by a tool such as a mallet. A shaft having a pointed terminating end for penetrating a ground surface. The shaft extends from the lower surface of the head to the terminating end, wherein the shaft is configured to be driven into the ground upon impact on the head. A plurality of ridges are disposed along the shaft for secure penetration and prevention of displacement or sliding in the ground. An aperture is located on the head, accessible for snugly fitting the leg of a signage frame when the stake is fixed into the ground.

A method for installing a sign stake into a ground surface, the method comprising placing the pointed terminating end of the stake on the ground surface, striking the upper surface of the head of the stake with a lightweight mallet to drive the stake into the ground, continuing the striking until the head of the stake abuts the ground surface, wherein the ridges on the shaft of the stake facilitate secure penetration and prevent displacement or sliding in the ground, and inserting the leg of a signage frame into the aperture of the head once the stake is fully inserted into the ground.

In another embodiment of the present invention, a method of installing a signage board frame using a pair of signage board supporting stakes is disclosed. The method includes the steps of providing a pair of sign stakes designed for supporting a sign frame with legs, each stake features an aperture for receiving a bottom end of the respective legs of the frame, wherein the sign stakes are installed into the ground at a distance equal to the distance between the legs. The aperture of each stake provides a snug fit for the bottom end of a leg, thereby securing the frame in a stable and upright orientation without the need for digging or fastening the legs directly into the ground.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
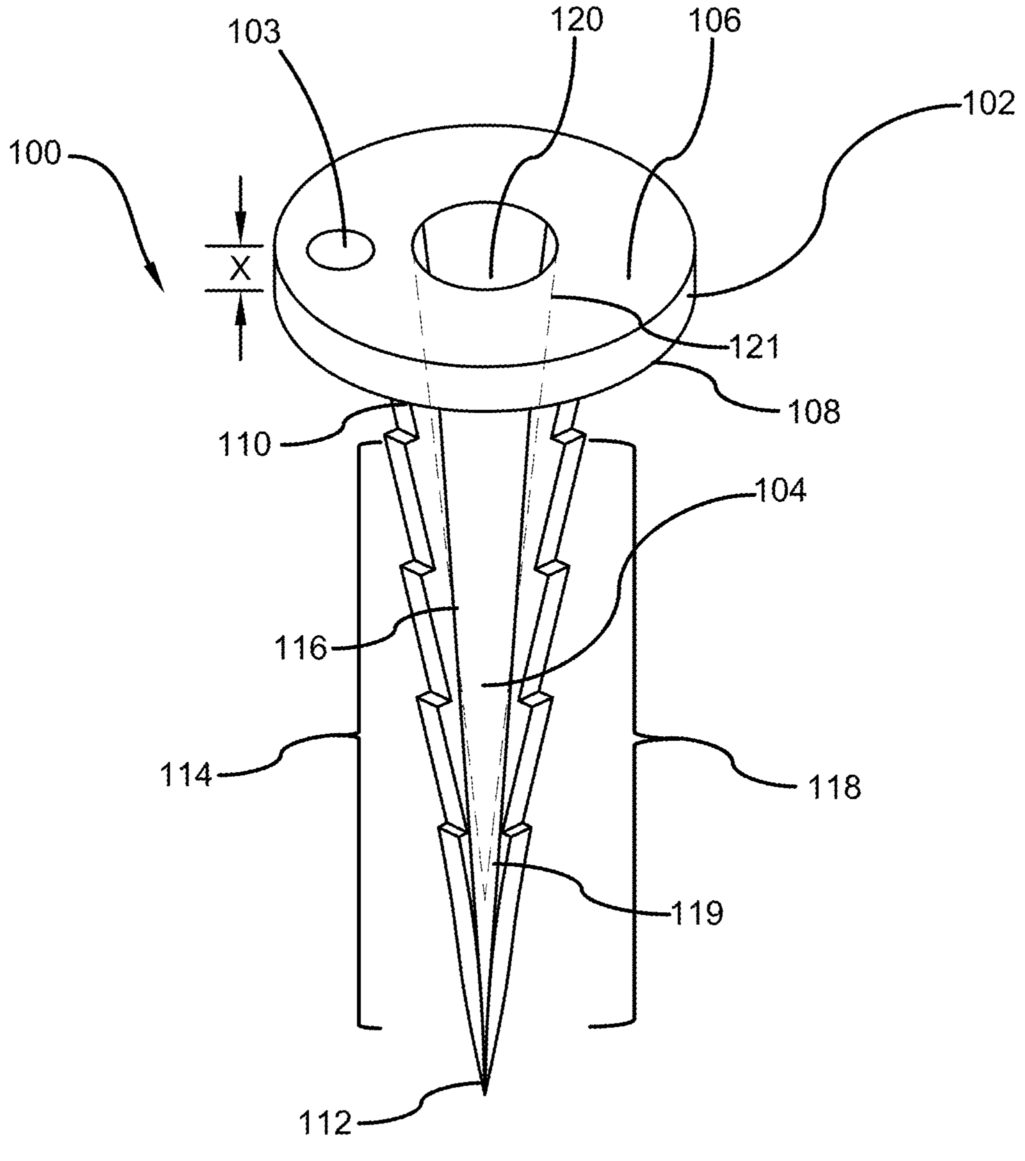
FIG. 1 illustrates a perspective view of the ground stake of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for heavy-duty ground stakes for supporting the legs of sign frames. There is also a long-felt need in the art for a ground stake that is designed to accommodate and support the leg of a sign frame. Additionally, there is a long-felt need in the art for a ground stake that obviates installation of a sign frame directly into the ground. Moreover, there is a long-felt need in the art for an improved stake that includes a small aperture on top of the stake to receive the sign leg and keep the leg secure and. upright to advertise the signage. Further, there is a long-felt need in the art for a stake designed for sign frames that addresses the fragility, susceptibility to damage and bending, and the consequent inconvenience of conventional frames. Finally, there is a long-felt need in the art for an improved stake that makes it much easier and more convenient to support signs that designate a real estate sale, a voting issue, an election, a garage sale, a yard sale, and much more.

The present invention, in one exemplary embodiment, is a ground stake for supporting and displaying signage. The ground stake includes a head having an upper surface and a lower surface. A central aperture is disposed in the head designed to receive and secure the leg of a signage frame. A shaft extends from the head and tapers towards a pointed terminating end. The shaft includes a series of longitudinal ridges on opposing sides for enhanced ground gripping. The length of the shaft ranges from approximately 1.00 inches to 8.00 inches and the diameter of the head ranges from approximately 0.5 inches to 2 inches.

Referring initially to the drawings, FIG. 1 illustrates a perspective view of the ground stake of the present invention in accordance with the disclosed architecture. The sign board supporting ground stake 100 of the present invention is designed for securely supporting and displaying signs such as campaign, yard, and garage sale signs. Further, the sign stake 100 is designed to be easily hammered into the ground and to receive and accommodate the legs of a sign. More specifically, the ground stake 100 includes a head 102 and a tapered shaft 104. The head 102 is preferably round and includes an upper surface 106 and a lower surface 108. The tapered shaft 104 extends from the top end 110 and terminates at the pointed terminating end 112. The top end 110 is positioned at the lower surface 108 of the head 102.

A first plurality of ridges 114 are integrated to one side 116 of the shaft 104 and a second plurality of symmetrical ridges 118 are integrated to the opposing side 119 of the shaft 104. Each ridge of the ground stake 100 points towards the terminating end 112 and the ridges 114, 118 run longitudinally along the shaft 104. The ridges 114, 118 are used for retaining, gripping, and securing the ground stake 100 into a ground surface. The pointed terminating end 112 allows easy hammering of the stake 100 into the ground and the wider top end 110 of the shaft 104 provides a stable installation on the ground with the head 102 abutting the top surface of the ground.

The upper surface 106 of the head 102 has an aperture 120 disposed therein for receiving and accommodating a bottom end of a leg of an advertising frame. The aperture 120 is preferably disposed at the center of the upper surface 106 and provides an opening through the head 102 to a continuous cavity 121 extending through a portion of the shaft 104. In one exemplary embodiment, the cavity 121 extends through a majority of the length of the shaft 104. The aperture 120 and cavity 121 have a diameter compatible with standard signage frame legs for providing a snug fit of the leg preventing swinging or leaning of a signage leg, and/or unintentional disengagement and dislodging of the leg.

A length of the shaft 104 extending between the top end 110 and the terminating end 112 can range from about 1.00 inches to about 8.00 inches. The diameter of the head 102 can range from about 0.50 inches to about 2.00 inches. The head 102 can have a thickness (Arrow A) from about 0.25 inches to about 1.50 inches in different embodiments. The stake 100 can be made from heavy-duty durable and rigid plastic, metal, or any other similar material which is strong enough to withstand external elements, hammering, and usage over time.

Figure 2A:
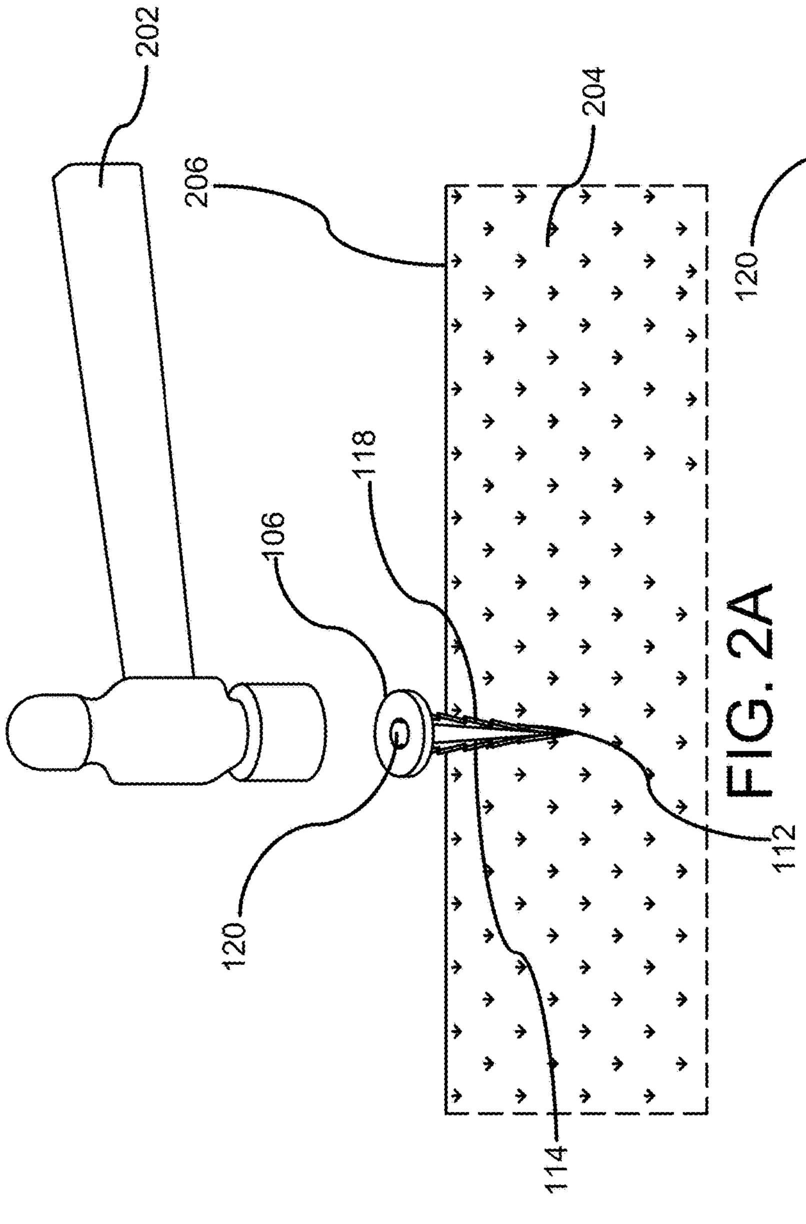
FIGS. 2A and 2B illustrate perspective views showing a stake being pounded and inserted into a ground surface in accordance with the disclosed structure.
Figure 2B:
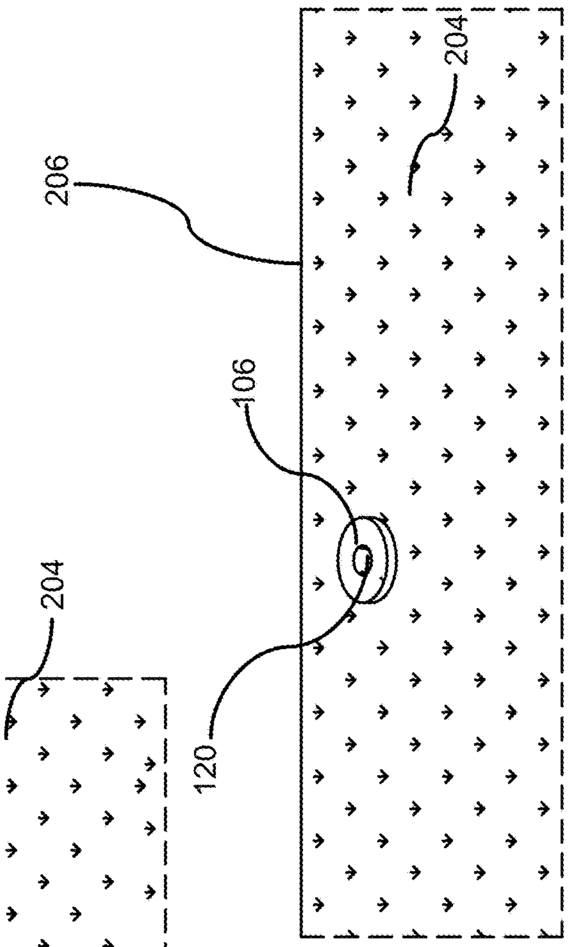

FIGS. 2A and 2B illustrate perspective views showing a stake being pounded and inserted into a ground surface in accordance with the disclosed structure. The sign stake 100 is lightweight and can be pounded easily using a lightweight mallet 202 even on a hard surface. As illustrated in FIG. 2A, for securing the stake 100 into the ground 204, the terminating end 112 is placed on a ground surface 206 and is hit on the upper surface 106 of the head 102 using a tool such as a mallet 202. The pointed terminating end 112 penetrates the ground surface 206 and the shaft 104 drives into the ground 204. The head 102 abuts the ground surface 206 for securing the stake 100. The aperture 120 and cavity 121 are easily accessible to a user for snugly fitting a leg of a signage frame when the stake 100 is fixed into the ground 204. The ridges 114, 118 provide a secure penetration inside the ground without any displacement or sliding.

Figure 3A:
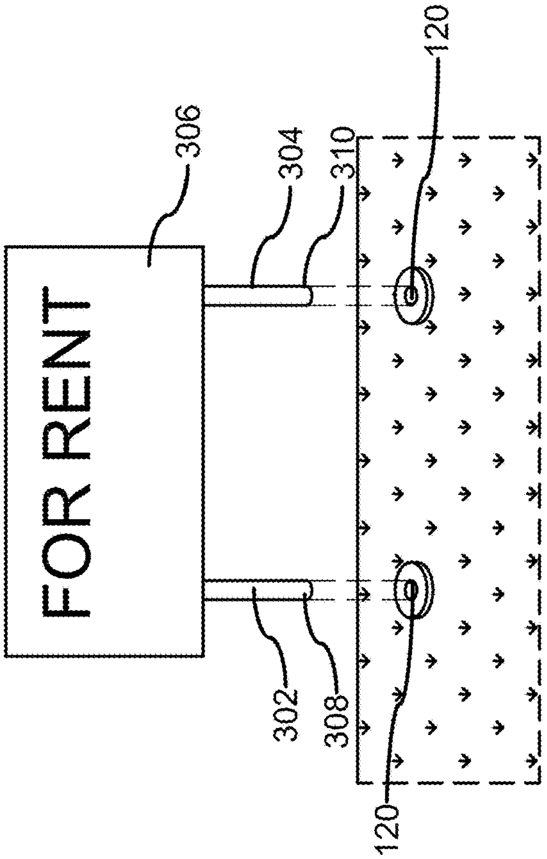
FIGS. 3A and 3B illustrate perspective views showing a pair of sign stakes inserted into the ground for supporting a signage frame in accordance with disclosed structure.
Figure 3B:
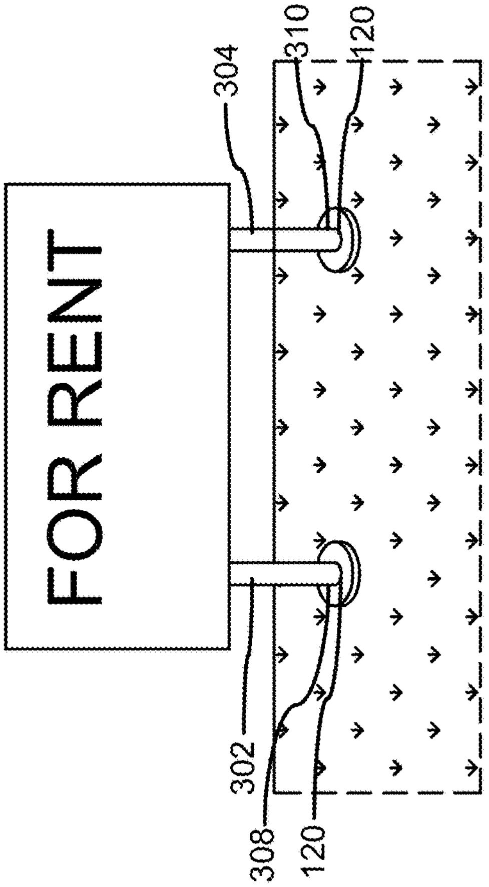

FIGS. 3A and 3B illustrate perspective views showing a pair of sign stakes inserted into the ground for supporting a signage frame in accordance with the disclosed structure. For supporting signs of different types of advertisements, two sign stakes 100 are installed into the ground. The stakes 100 are installed at a distance equal to the distance between the legs 302, 304 of the frame 306. When stakes 100 are installed, the aperture 120 and cavity 121 of each stake 100 are accessible for inserting the bottom end 308, 310 of the legs 302, 304, respectively.

As illustrated in FIG. 3B, the bottom ends 308, 310 are inserted into the aperture of the corresponding stakes 100 for a snug fit. The stake 100 obviates digging ground and fastening the legs 302, 304 directly into the ground. Further, the stakes prevent the swinging or leaning of the frame 304 in wind and maintains proper orientation of the frame 306 and the sign 312. No additional tool is required for fastening or engaging the legs 302, 304 with the stakes. Further, the frame 306 can easily be removed from the stakes when no longer required.

The sign board supporting ground stake 100 of the present invention can be used for different applications. In one embodiment, a single stake can be installed for using a direction sign or an emergency sign. The stake can be installed on any surface and is pushed into the ground until the head 102 abuts the ground surface.

In some embodiments, a photoluminescence coating is covered on the sign stake 100. The coating can allow users to detect the stake 100 even in low light or at night. In other embodiments, the head 102 embeds solar-powered LED light 103 for illuminating during night or in low-light conditions.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "sign stake", "ground stake", "stake", "sign board supporting ground stake", and "sign board leg accommodating ground stake" are interchangeable and refer to the ground stake with integrated sign board leg aperture 100 of the present invention.

Notwithstanding the foregoing, the ground stake with integrated sign board leg aperture 100 of the present invention can be of any suitable size and configuration as is known in the art without affecting the overall concept of the invention, provided that it accomplishes the above-stated objectives. One of ordinary skill in the art will appreciate that the ground stake with integrated sign board leg aperture 100 as shown in the FIGS. are for illustrative purposes only, and that many other sizes and shapes of the ground stake with integrated sign board leg aperture 100 are well within the scope of the present disclosure. Although the dimensions of the ground stake with integrated sign board leg aperture 100 are important design parameters for user convenience, the ground stake with integrated sign board leg aperture 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A sign board supporting ground stake comprising:

a ground stake having a head and a tapered shaft;

wherein said head having an upper surface and a lower surface;

wherein said tapered shaft extending from said lower surface to a terminal pointed end;

wherein said head and said tapered shaft having a rigid material for hammering into the ground;

wherein said tapered shaft having a first plurality of ridges along a first side of said tapered shaft;

wherein each ridge of said first plurality of ridges points towards said terminal pointed end;

wherein said head having an aperture disposed therethrough for receiving and accommodating a bottom end of a leg of the sign board;

wherein said tapered shaft having a cavity therein for receiving and accommodating a bottom end portion of the leg of the sign board; and wherein said tapered shaft having a second plurality of ridges along a second side of said tapered shaft opposite the first plurality of ridges;

wherein the head is a round head; and wherein said cavity extends through a majority of a length of said tapered shaft.

2. The sign board supporting ground stake of claim 1, wherein said head abuts a top surface of the ground after said ground stake is hammered into the ground.

3. The sign board supporting ground stake of claim 1, wherein said first plurality of ridges are oriented longitudinally along said tapered shaft.

4. The sign board supporting ground stake of claim 3, wherein said first plurality of ridges are symmetrical to said second plurality of ridges.

5. The sign board supporting ground stake of claim 4, wherein each ridge of said second plurality of ridges points towards said terminal pointed end.

6. The sign board supporting ground stake of claim 5, wherein said second plurality of ridges are oriented longitudinally along said tapered shaft.

7. The sign board supporting ground stake of claim 6, wherein said tapered shaft having a length from 1.00 inches to 8.00 inches, wherein said head having a diameter from 0.50 inches to 2.00 inches, and further wherein said head having a thickness from 0.25 inches to 1.50 inches.

* * * * *